(12) United States Patent
Shikatani et al.

(10) Patent No.: US 10,267,907 B2
(45) Date of Patent: Apr. 23, 2019

(54) RADAR APPARATUS AND RADAR STATE ESTIMATION METHOD

(71) Applicant: Panasonic Intellectual Property Management Co., Ltd., Osaka (JP)

(72) Inventors: Maiko Shikatani, Kanagawa (JP); Hirofumi Nishimura, Kanagawa (JP); Asako Hamada, Kanagawa (JP); Takaaki Kishigami, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 607 days.

(21) Appl. No.: 14/958,750

(22) Filed: Dec. 3, 2015

(65) Prior Publication Data

US 2016/0178742 A1   Jun. 23, 2016

(30) Foreign Application Priority Data

Dec. 18, 2014 (JP) .................................. 2014-256374

(51) Int. Cl.
*G01S 13/60* (2006.01)
*G01S 13/93* (2006.01)

(52) U.S. Cl.
CPC .......... *G01S 13/60* (2013.01); *G01S 13/931* (2013.01); *G01S 2013/9385* (2013.01)

(58) Field of Classification Search
CPC ...................................................... G01S 13/60
USPC ...................................................... 342/70–72
See application file for complete search history.

(56) References Cited

U.S. PATENT DOCUMENTS

| | | | |
|---|---|---|---|
| 4,509,052 A | 4/1985 | Cash | |
| 7,522,091 B2 * | 4/2009 | Cong | B60K 31/0008 342/107 |
| 8,082,101 B2 * | 12/2011 | Stein | G08G 1/16 701/301 |
| 8,433,510 B2 * | 4/2013 | Bradai | B60Q 1/085 701/421 |
| 9,162,682 B2 | 10/2015 | Hohm et al. | |
| 9,694,812 B2 * | 7/2017 | Ammon | B60W 30/025 |

(Continued)

FOREIGN PATENT DOCUMENTS

| | | |
|---|---|---|
| DE | 10 2010 048 896 A1 | 4/2012 |
| DE | 10 2012 203 037 A1 | 8/2013 |

(Continued)

OTHER PUBLICATIONS

Extended European Search Report, dated Apr. 22, 2015, for corresponding EP Application No. 15198193.3-1812, 8 pages.

*Primary Examiner* — Marcus E Windrich
(74) *Attorney, Agent, or Firm* — Seed IP Law Group LLP

(57) ABSTRACT

A radar apparatus is mountable on a vehicle, transmits a radar signal, and includes a radio receiver that receives reflected wave signals being the radar signal reflected by multiple objects present in the viewing angle of the radar apparatus via a receiving antenna mountable on a side of the vehicle, a signal processing unit that determines the azimuths of the objects, the Doppler speeds between the radar apparatus and the objects, and the intensities of the reflected wave signals by using the reflected wave signals, and a radar state estimation unit that estimates the speed and traveling direction of the radar using the azimuths of the objects, the Doppler speeds, and the intensities.

6 Claims, 16 Drawing Sheets

(56) References Cited

U.S. PATENT DOCUMENTS

| | | | | |
|---|---|---|---|---|
| 2005/0179580 A1* | 8/2005 | Cong | ................ | B60K 31/0008 |
| | | | | 342/70 |
| 2010/0017128 A1* | 1/2010 | Zeng | ................ | B60W 40/105 |
| | | | | 701/301 |
| 2011/0295549 A1 | 12/2011 | Takabayashi et al. | | |
| 2012/0169532 A1* | 7/2012 | Yamada | ................ | G01S 13/87 |
| | | | | 342/25 R |
| 2013/0124061 A1* | 5/2013 | Khanafer | ................ | G06F 17/00 |
| | | | | 701/70 |
| 2015/0025786 A1* | 1/2015 | Hohm | ................ | B60W 40/105 |
| | | | | 701/300 |
| 2015/0225786 A1 | 1/2015 | Hohm et al. | | |

FOREIGN PATENT DOCUMENTS

| | | |
|---|---|---|
| JP | 2009-236570 | 10/2009 |
| JP | 2014-169949 A | 9/2014 |

* cited by examiner

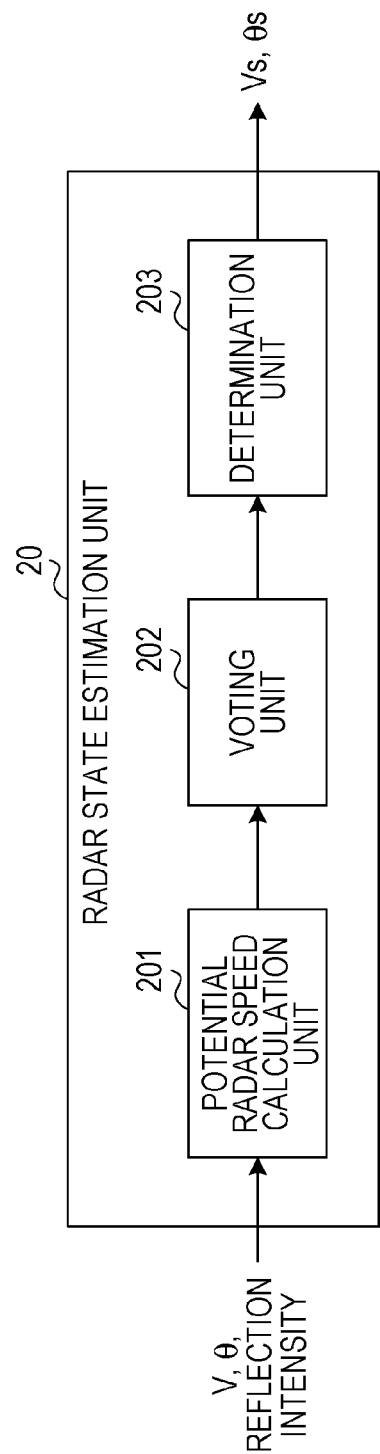

RADAR APPARATUS AND RADAR STATE ESTIMATION METHOD

BACKGROUND OF THE INVENTION

1. Field of the Invention

The present disclosure relates to a radar apparatus and a radar state estimation method that estimate the speed of a moving object (e.g., vehicle).

2. Description of the Related Art

Japanese Unexamined Patent Application Publication No. 2009-236570 discloses a method including receiving, by a radar apparatus mounted on a vehicle, reflected wave signals from stationary objects and calculating, by the radar apparatus, the vehicle speed from the speeds relative to the stationary objects (hereafter referred to as "Doppler speeds").

SUMMARY

However, Japanese Unexamined Patent Application Publication No. 2009-236570 has difficulty in detecting stationary objects other than those in the forward direction of the vehicle, since the radar apparatus is disposed on the front of the vehicle. Further, when the vehicle is making a turn at an intersection or the like or traveling along a curve, that is, when the vehicle is placed in a turning state, the traveling direction of the vehicle does not agree with the forward direction of the vehicle (the measurement direction of the radar apparatus).

For this reason, when the vehicle is making a turn, the vehicle speed includes a speed indicating the front-back movement of the vehicle, as well as a Doppler speed based on the lateral movement of the vehicle. Accordingly, if a measured Doppler speed relative to a stationary object is regarded as the vehicle speed, the vehicle speed would include an error, making it difficult for the radar apparatus to estimate the vehicle speed accurately.

Thus, a non-limiting exemplary embodiment of the present disclosure provides a radar apparatus and radar state estimation method that can accurately estimate the traveling direction and speed of any position in a vehicle even when the vehicle is making a turn.

In one general aspect, the techniques disclosed here feature: a radar apparatus mountable on a vehicle. The radar apparatus includes a transmitter that transmits a radar signal via a transmission antenna mountable on a side of the vehicle, a receiver that receives one or more reflected wave signals via a receiving antenna mountable on a side of the vehicle, the reflected wave signals being the radar signal reflected by one or more objects, a signal processing unit that determines azimuths of the objects, Doppler speeds between the radar apparatus and the objects, and intensities of the reflected wave signals by using the reflected wave signals, and a state estimation unit that estimates a speed and a traveling direction of the radar apparatus using the azimuths of the objects, the Doppler speeds, and the intensities of the reflected wave signals.

These general and specific aspects may be implemented using a device, a system, a method, and a computer program, and any combination of devices, systems, methods, and computer programs.

According to the present disclosure, it is possible to accurately estimate the traveling direction and speed of any position in the vehicle even when the vehicle is making a turn.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

BRIEF DESCRIPTION OF DRAWINGS

FIG. 6 shows the internal configuration of a radar state estimation unit according to the first embodiment;

DETAILED DESCRIPTION

Now, embodiments of the present disclosure will be described in detail with reference to the accompanying drawings.

A radar apparatus according to the present disclosure estimates the moving direction and speed of the radar apparatus in a radar coordinate system using a radar state estimation method (to be discussed later). As a result of the estimation, the radar apparatus calculates the moving direction and speed of any position in the vehicle using the mounting position of the radar apparatus in the vehicle (the origin of the vehicle is the midpoint between the rear wheels) and the mounting orientation of the radar apparatus in the vehicle.

[Configuration of Radar Apparatus]

First Embodiment

Figure 1:
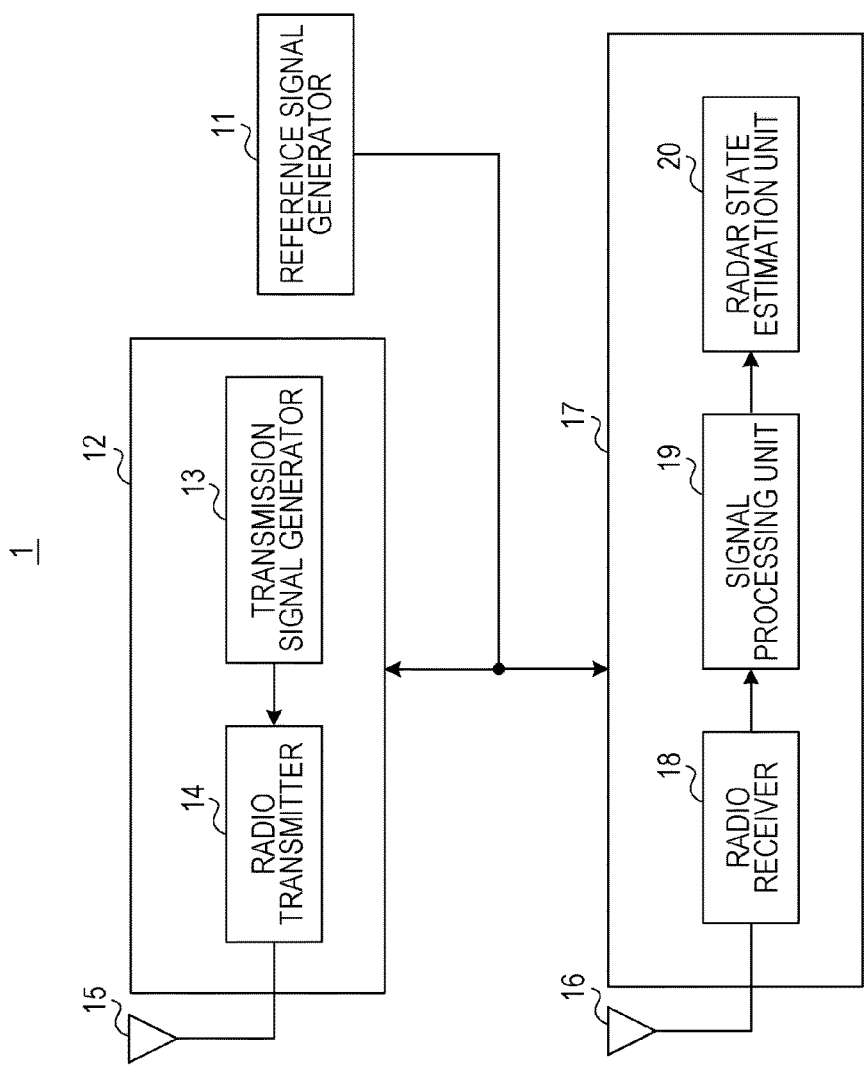
FIG. 1 shows the configuration of a radar apparatus according to a first embodiment.

FIG. 1 is a block diagram schematically showing the configuration of a radar apparatus 1 according to the present embodiment. The radar apparatus 1 shown in FIG. 1 includes a reference signal generator 11, a radar transmitter 12, a transmission antenna 15, a receiving antenna 16, and a radar receiver 17.

The radar apparatus 1 according to the present embodiment is mounted on a moving object (e.g., vehicle) which travels straight or makes a turn along the traveling direction. The receiving antenna 16 is mounted on a side of the vehicle, and the viewing angle of the radar apparatus is set in the direction of the side of the vehicle. The radar apparatus 1 may be mounted on moving objects other than vehicles, for example, motorcycles or autonomously walking robots. The side of the vehicle may be a bumper or mirror.

The radar apparatus 1 transmits a radio-frequency radar transmission signal generated by the radar transmitter 12 via the transmission antenna 15. The radar apparatus 1 then receives reflected wave signals generated through the reflection of the radar transmission signal from objects (not shown) via the receiving antenna 16. The radar apparatus 1 then performs signal processing on the received reflected wave signals and detects the radar traveling direction and speed of the mounting position of the radar apparatus 1 using the signal processing result.

The transmission antenna 15 and receiving antenna 16 may each include multiple antennas.

Next, the configurations of the elements of the radar apparatus 1 will be described briefly.

The reference signal generator 11 is connected to the radar transmitter 12 and radar receiver 17. The reference signal generator 11 provides reference signals to the radar transmitter 12 and radar receiver 17 so that the reference signal generator 11 and radar receiver 17 synchronously perform processes.

The radar transmitter 12 includes a transmission signal generator 13 and a radio transmitter 14.

The transmission signal generator 13 generates a transmission reference clock signal by multiplying the frequency of the reference signal generated by the reference signal generator 11 by a predetermined integral factor. The transmission signal generator 13 then operates based on the transmission reference clock signal.

The transmission signal generator 13 also generates a base-band transmission signal, such as a coded pulse signal or chirped pulse signal, and transmits it in a predetermined transmission cycle.

The radio transmitter 14 generates a radar transmission signal in a carrier frequency range (e.g., extremely radio-frequency range) by up-converting the transmission signal generated by the transmission signal generator 13.

The transmission antenna 15 radiates the radar transmission signal generated by the radio transmitter 14 into the air.

The receiving antenna 16 receives reflected wave signals generated through the reflection from objects of the radar transmission signal transmitted by the radar transmitter 12. The reflected wave signals (radio-frequency radar reception signals) received by the receiving antenna 16 are inputted to the radar receiver 17.

The radar receiver 17 includes a radio receiver 18, a signal processing unit 19, and a radar state estimation unit 20 serving as a state estimation unit.

The radio receiver 18 receives the reflected wave signals generated through the reflection of the radar transmission signal from the objects, using the receiving antenna 16 mounted on the side of the vehicle. The radio receiver 18 then generates base-band reception signals by down-converting the radar reception signals received by the receiving antenna 16.

The signal processing unit 19 calculates the correlation between the radar transmission signal transmitted by the radar transmitter 12 in the transmission cycle and each reception signal received from the radio receiver 18. The signal processing unit 19 also determines a reception delay time elapsed until each reflected wave signal is received, that is, a delay time elapsed after the radar transmission signal is transmitted.

The signal processing unit 19 then performs coherent addition (Doppler frequency analysis) on a correlation calculation result corresponding to each reception delay time. Thus, the signal processing unit 19 obtains multiple Doppler frequency component coherent addition results for each reception delay time. The Doppler frequency components are frequency variation information which occurs in each reflected wave signal due to the Doppler effect when a relative movement in the distance direction exists between each object, which has reflected the radar transmission signal, and the radar apparatus 1. In other words, the Doppler frequency components are frequency components indicating the speed in the distance direction of the radar apparatus 1 relative to the object which has reflected the radar transmission signal.

The signal processing unit 19 then obtains distance-specific, azimuth-specific, and Doppler frequency component-specific power profiles (reflection intensity) of the reflected wave signals using the Doppler frequency component coherent addition results. Note that the signal processing unit 19 may obtain such power profiles when the Doppler frequency component coherent addition results are greater than or equal to a threshold which exceeds the noise level.

The signal processing unit 19 then estimates the arrival directions of the reflected wave signals using the power profiles to obtain the speeds (Doppler speeds) of the objects relative to the radar apparatus 1. For example, the signal processing unit 19 converts the Doppler frequency components into Doppler speed components. The signal processing unit 19 then determines the azimuths of the objects present in the viewing angle of the radar apparatus 1 (the radar viewing angle), the distances, the Doppler speeds between the vehicle and the objects, and the reflection intensities (power) using the reflected wave signals and inputs these to the radar state estimation unit 20.

[Relationship between Radar Viewing Angle θ and Doppler Speed V]

Figure 2:
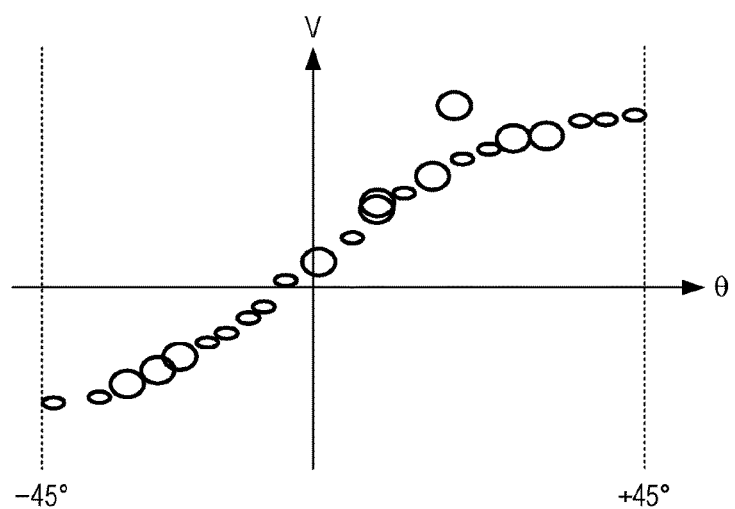
FIG. 2 shows an example of Doppler speeds observed by a signal processing unit according to the first embodiment.

FIG. 2 shows an example of Doppler speeds V corresponding to the azimuths obtained from the power profiles. The horizontal axis of FIG. 2 represents the radar viewing angle θ (the azimuths of the objects), and the vertical axis thereof represents the Doppler speed V. White circles shown in FIG. 2 represent the reflected wave signals reflected from stationary objects or moving objects and having intensities higher than or equal to a threshold. The size (area) of each white circle represents the intensity of reflection from the corresponding object.

Figure 3A:
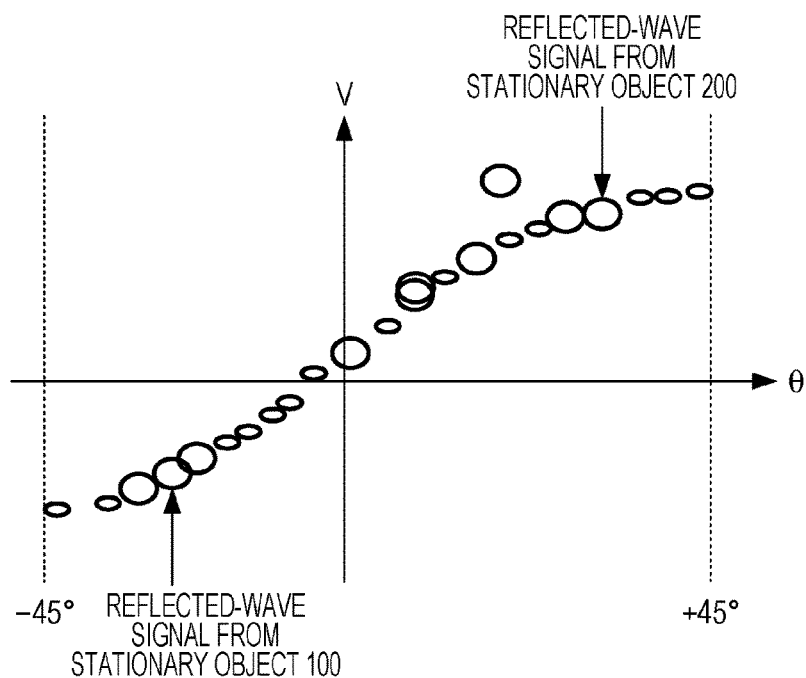
FIG. 3A shows an example of an azimuth-Doppler map when the vehicle is traveling straight.
Figure 4A:
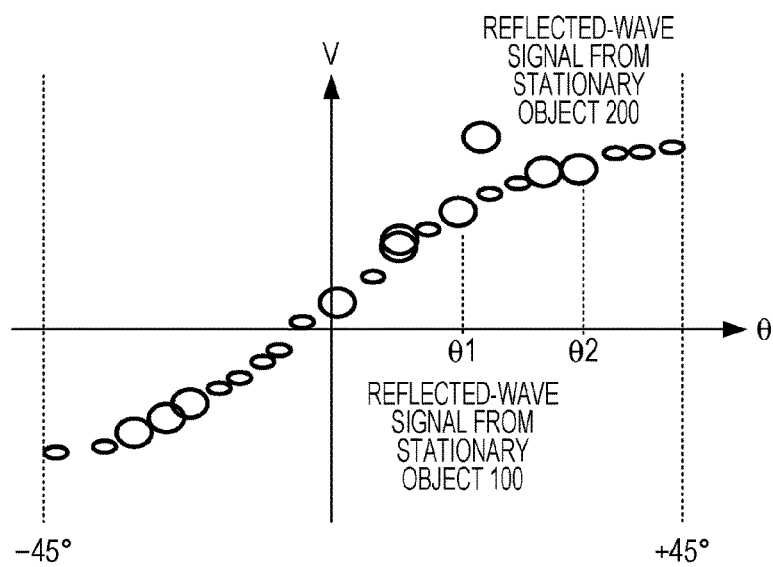
FIG. 4A shows an example of an azimuth-Doppler map when the vehicle is traveling straight.
Figure 5A:
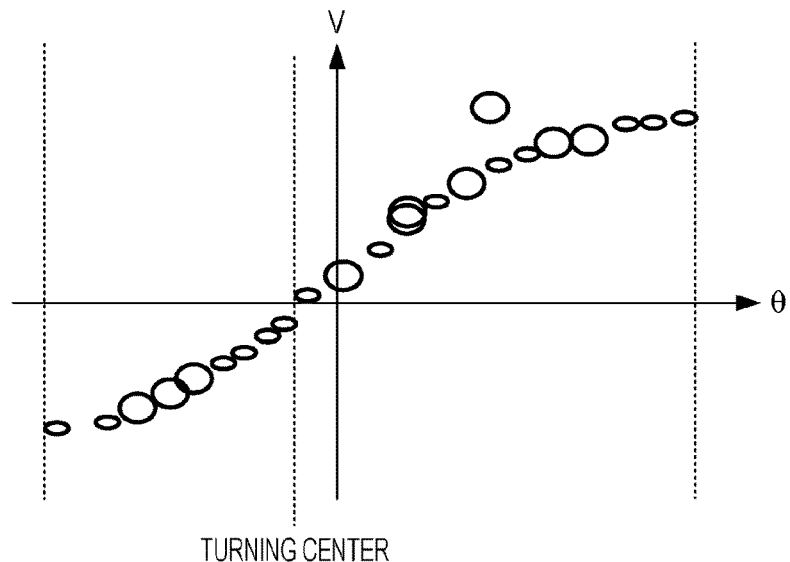
FIG. 5A shows an example of an azimuth-Doppler map when the vehicle is making a turn.

The above description on FIG. 2 also applies to FIGS. 3A, 4A, and 5A. Referring to these figures and noting the positional relationships between the radar apparatus and stationary objects, there will be described the relationships between the azimuths in the radar viewing angle θ and the relative speeds (Doppler speeds) obtained from the reflected wave signals from the stationary objects.

Figure 3B:
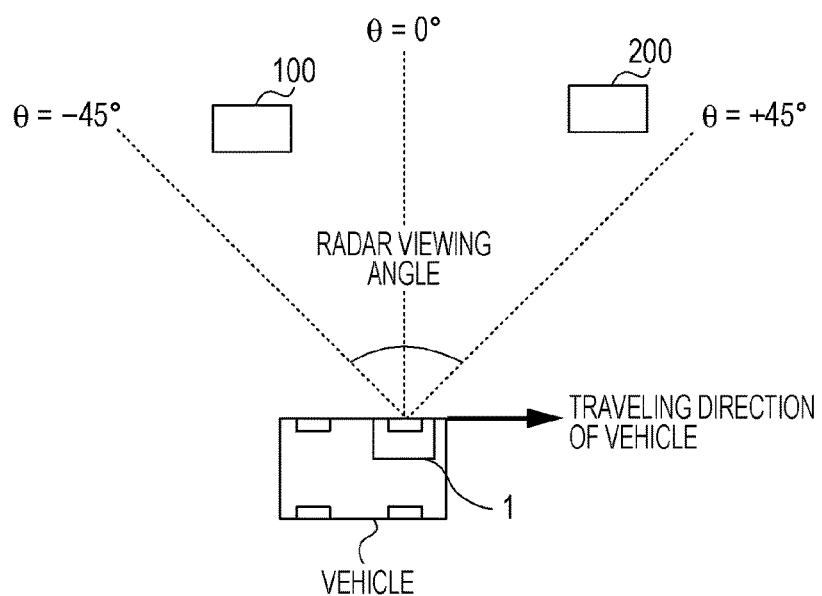
FIG. 3B shows the relationship among the viewing angle of a radar apparatus mounted on a vehicle traveling straight, the traveling direction of the vehicle, and the positions of reflected wave signals from stationary objects.
Figure 4B:
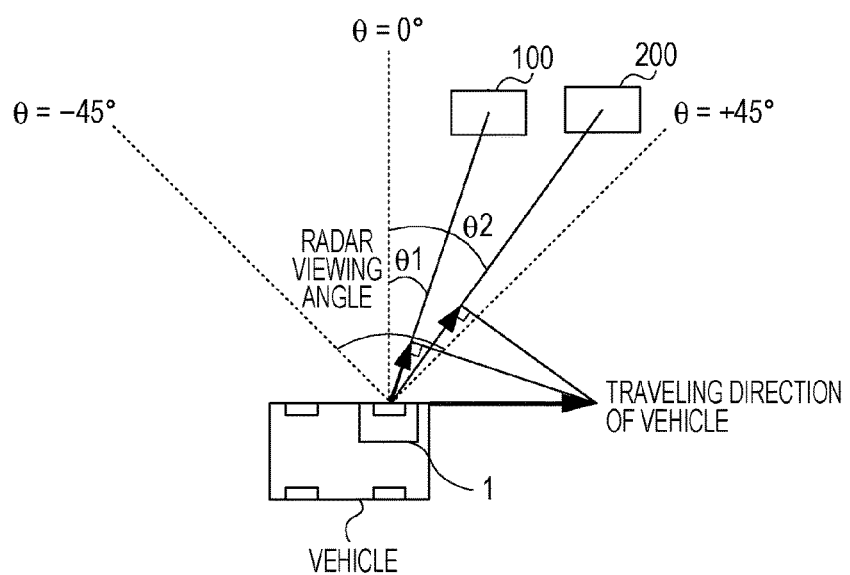
FIG. 4B shows the relationship among the viewing angle of the radar apparatus mounted on the vehicle traveling straight, the traveling direction of the vehicle, and the positions of reflected wave signals from stationary objects.

FIGS. 3A and 4A are diagrams showing the relationship between the Doppler speed and the radar viewing angle θ (azimuth) (hereafter referred to as "azimuth-Doppler maps") estimated when the vehicle is traveling straight and the radar apparatus 1 is mounted on the left side of the vehicle. FIGS. 3B and 4B are diagrams showing the relationship among the viewing angle θ of the radar apparatus 1 mounted on the vehicle traveling straight, the traveling direction of the vehicle, and the positions of reflected wave signals from stationary objects 100 and 200.

Figure 8:
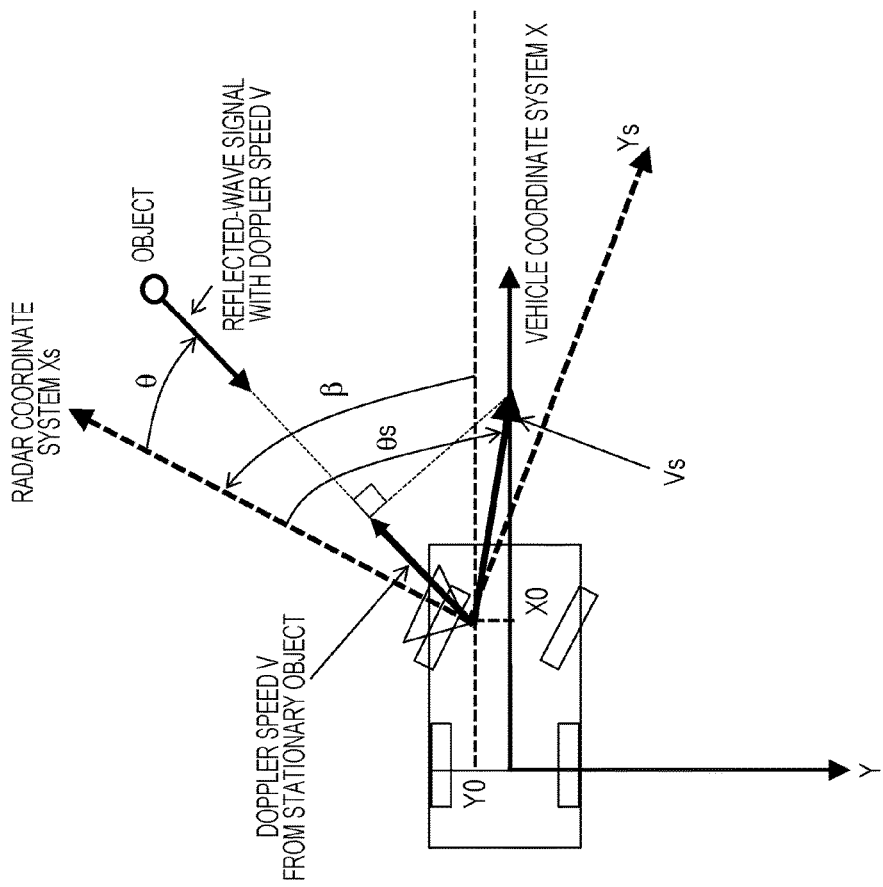
FIG. 8 shows the relationship between the radar apparatus according to the first embodiment and vehicle.

FIGS. 3B and 4B show examples in which the radar device 1 is mounted on the vehicle in such a manner that the direction of the radar viewing angle θ of 0° is the left direction of the vehicle (a direction perpendicular to the forward direction of the vehicle) (that is, β=−90° shown in FIG. 8). The radar viewing angle θ ranges from −45° to +45°.

When the direction of the radar viewing angle θ of 0° is the left direct of the vehicle and a stationary object exists in front of the vehicle, the Doppler speed from the stationary object is the highest. For this reason, in FIGS. 3B and 4B, when θ is +45° (a direction closest to the forward direction of the vehicle for the radar apparatus 1), the Doppler speed V is the highest value.

In FIG. 3B, the stationary object 100 lies in the direction in which the stationary object 100 moves away from the radar apparatus 1. Accordingly, in FIG. 3A, the Doppler speed takes a negative value in the direction in which the stationary object 100 exists. On the other hand, in FIG. 3B, the stationary object 200 lies in the direction in which it approaches the radar apparatus 1. Accordingly, in FIG. 3A, the Doppler speed takes a positive value in the direction in which there exists a reflected wave signal from the stationary object 200.

In FIG. 4B, the stationary objects 100 and 200 lie in the direction in which these objects approach the radar apparatus 1. Accordingly, in FIG. 4A, the Doppler speed takes a positive value in the direction (radar viewing angle) in which there exist reflected wave signals from the stationary objects 100 and 200. Note that in FIG. 4A, the Doppler speed is more significantly affected by speed components of the vehicle as the azimuth (the absolute value of the radar viewing angle θ) increases. In FIG. 4B, the radar viewing angle θ2 with respect to the stationary object 200 is larger than the radar viewing angle θ1 with respect to the stationary object 100 (|θ1|<|θ2|). Accordingly, the Doppler speed (absolute value) with respect to the stationary object 200 is higher than the Doppler speed (absolute value) with respect to the stationary object 100.

Figure 5B:
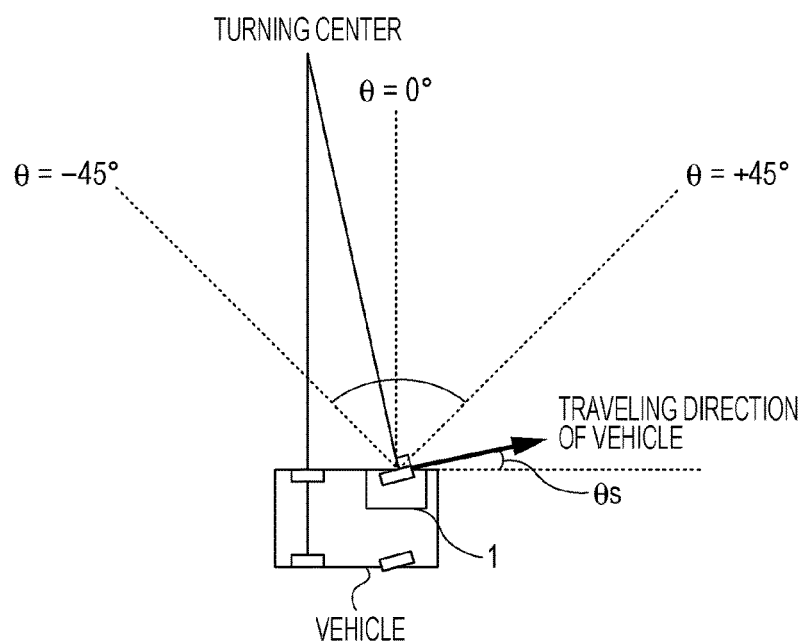
FIG. 5B shows the relationship among the radar viewing angle of the radar apparatus disposed on the vehicle making a left turn, the traveling direction of the vehicle, and the direction of the turning center of the vehicle.

In FIG. 5B, the radar apparatus 1 is mounted directly above the front-left wheel of the vehicle, and the traveling direction of the radar apparatus 1 is the front-wheel direction. Accordingly, the turning center lies in a direction perpendicular to the traveling direction of the vehicle.

FIG. 5A is a diagram showing the relationship between the Doppler speed and the azimuth (radar viewing angle θ) (azimuth-Doppler map) when the vehicle is making a left turn. FIG. 5B is a diagram showing the relationship among the radar viewing angle of the radar apparatus 1 mounted on the vehicle making a left turn, the traveling direction Os of the vehicle, and the direction of the turning center of the vehicle.

As with FIGS. 3B and 4B, FIG. 5B shows an example in which the radar apparatus 1 is mounted on the vehicle in such a manner that the direction of the radar viewing angle θ of 0° is the left direction of the vehicle (a direction perpendicular to the forward direction of the vehicle) (β=−90° shown in FIG. 8). The radar viewing angle θ ranges from −45° to +45°.

Since the direction of the radar viewing angle θ of 0° is the left direction of the vehicle in FIG. 5B)(β=−90°, the Doppler speed is the highest in the traveling direction of the vehicle.

Accordingly, in FIG. 5A, the Doppler speed V corresponding to θ=+45° (a direction closest to the traveling direction of the vehicle for the radar apparatus 1) in the vehicle making a left turn has the largest value. The direction in which the Doppler speed is 0 is the direction of the turning center of the vehicle. In FIG. 5B, the traveling direction of the vehicle is a direction obtained by shifting the direction of the turning center of the vehicle forward by 90° (this also applies to FIGS. 3B and 4B).

The Doppler speed, which is obtained from a reflected wave signal from a stationary object, does not depend on the distance from the stationary object.

The radar state estimation unit 20 estimates the speed Vs and traveling direction θs of the vehicle in the mounting position of the radar apparatus 1 (this speed will be referred to as the "radar speed") in the radar coordinate system using the azimuths (radar viewing angle) θ, the Doppler speeds V, and the reflection intensities of the reflected waves received from the signal processing unit 19. Specifically, the radar state estimation unit 20 selects a predetermined number of samples from among the received reflected wave signals (that is, from among samples represented by the multiple white circles shown in FIG. 2), inputs the azimuths (radar viewing angles) θ, the Doppler speeds, and the reflection intensities of the selected samples, and determines the radar speed Vsd and the traveling direction θsd in the radar coordinate system through a voting process. The voting process will be described later.

The radar state estimation unit 20 then derives the traveling direction and speed of a particular position in the vehicle, for example, the front-left wheel using the radar speed Vsd, the traveling direction θsd, and the position information of the radar apparatus in the vehicle.

The relationship between the radar speed Vsd and traveling direction θsd, and the traveling direction and speed of a particular position in the vehicle will be described below.

When a typical automobile is traveling straight, the traveling direction and speed are uniform through all positions in the vehicle. On the other hand, when the vehicle is making a turn, the traveling direction and speed vary among the positions in the vehicle. Specifically, in a typical automobile, the front wheels serve as steering wheels, and the rear wheels are fixed. When the vehicle is making a turn, the turning center of the vehicle lies on an extension of a line connecting the left and right rear wheels, as shown in FIG. 5B. At this time, the entire vehicle is making a turn with the turning center laid on the line connecting the left and right rear wheels. Accordingly, the moving direction of the left and right rear wheels of the vehicle is the direction of a tangent to a circle making a turn, that is, the front-back direction of the vehicle.

On the other hand, the left and right front wheels move in the direction in which the front wheels are oriented, due to steering. Accordingly, the moving direction of the left and right front wheels differs from that of the left and right rear wheels. Further, the turning radium varies among the positions in the vehicle and therefore the speed also varies among the positions in the vehicle.

Since the traveling direction and speed vary among the positions in the vehicle making a turn, the vehicle speed is typically defined as the speed at the midpoint between the left and right rear wheels, which does not vary with the turn of the vehicle.

The radar apparatus 1 can calculate the traveling direction and speed of any position in the vehicle using the radar speed Vsd, the traveling direction θsd, position information indicating the mounting position of the radar apparatus 1 with respect to the midpoint between the left and right rear wheels, and orientation information indicating the mounting orientation of the radar apparatus 1 with respect to the front of the vehicle.

Specifically, the radar apparatus 1 can calculate the moving direction of the vehicle in the mounting position of the radar device 1 by using, as the turning center of the vehicle, the position in which a direction perpendicular to the turning center direction and the extension of the line connecting the left and right rear wheels cross each other. Thus, the radar apparatus 1 can calculate the angular velocity of the turn of the vehicle, the movement of the turning vehicle, and the moving direction and speed of any position in the vehicle using the distance from the turning center to the mounting position of the radar apparatus 1 and the speed of the mounting position of the radar device 1.

Accordingly, a general vehicle speed is obtained by calculating the speed of the midpoint between the left and right rear wheels.

The present disclosure is not limited to the calculation of the speed of the midpoint between the left and right rear wheels, which is a general vehicle speed, but rather aims to calculate the traveling direction and speed of any position in the vehicle.

FIG. 6 is a diagram showing the internal configuration of the radar state estimation unit 20. The radar state estimation unit 20 includes a potential radar speed calculation unit 201, a voting unit 202, and a determination unit 203.

The potential radar speed calculation unit 201 serving as a calculation unit calculates potential radar speeds Vs corresponding to multiple potential traveling directions θs which can be taken as the traveling direction of the radar apparatus 1, using the azimuths (radar viewing angle) θ and Doppler speeds V of the reflected wave signals.

The voting unit 202 performs a process of casting, as one vote, a potential speed Vs corresponding to a potential traveling direction θs into a two-dimensional ballot box generated by quantizing the traveling direction axis and speed axis.

Figure 7:
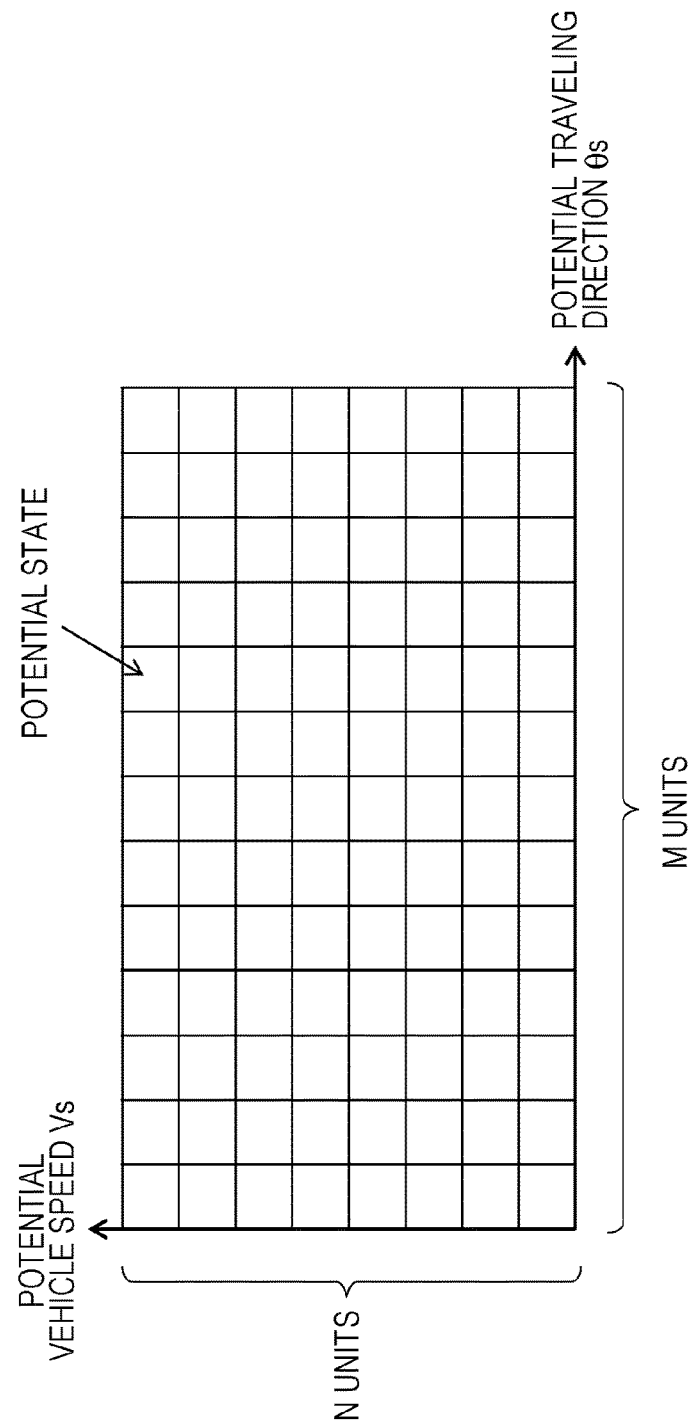
FIG. 7 shows an example of a voting process according to the first embodiment.

Specifically, there is prepared a ballot box in which multiple potential traveling directions θs and multiple potential speeds Vs falling within the range of values which can be taken as the speed of the radar apparatus 1 are preset. FIG. 7 shows an example of a conceptual diagram of a ballot box. In FIG. 7, the range of values which can be taken as the potential traveling direction θs of the radar apparatus 1 is divided into M units; the range of values which can be taken as the potential speed Vs of the radar apparatus 1 is divided into N units; and (M×N) number of potential states are set.

The voting unit 202 uses a ballot box which is a two-dimensional region composed of potential traveling directions θs and potential speeds Vs and in which evaluation values can be set for potential states.

The sizes of M and N may be set according to the degrees of estimation accuracy that the moving speed and traveling direction of the vehicle are required to have. For example, when higher degrees of estimation accuracy are required, the voting unit 202 increases the sizes of M and N. Each potential state has an evaluation value which defaults to 0.

The voting unit 202 assigns multiple potential states to each sample reflected wave signal and sets an evaluation value for each potential state. For the weight of one vote, one sample may be handled as one vote, or reflection intensities may be assigned as weights. Note that the same reflection intensity is assigned to the same potential speed Vs. The voting process performed by the voting unit 202 will be described in detail later.

The determination unit 203 determines, as the current moving state of the radar apparatus 1, a radar speed Vsd and radar traveling direction θsd corresponding to a potential state which has been assigned the largest evaluation value in the voting process by the voting unit 202, of the multiple potential states.

[Operation of Radar State Estimation Unit 20]

Next, the operation of the radar state estimation unit 20 will be described in detail.

<Calculation of Radar Speed Vs>

Formula (1) below represents the relationship among the Doppler speed V of a reflected wave signal reflected from an object toward the radar apparatus 1, the radar traveling direction θs (the rudder angle of the steering wheel), the radar speed Vs, and the azimuth θ of the object with respect to the radar apparatus 1.

FIG. 8 shows the radar apparatus 1 mounted on the vehicle. In the following description, two coordinate systems, a vehicle coordinate system and a radar coordinate system, will be used. The vehicle coordinate system is a coordinate system in which the forward direction of the vehicle is 0 degrees and the clockwise direction is the positive direction. The mounting orientation of the radar apparatus 1 is defined by the vehicle coordinate system. The forward direction of the radar apparatus 1 is β degrees in the vehicle coordinate system. The radar coordinate system is a coordinate system in which the forward direction of the radar is 0 degrees and the clockwise direction is the positive direction.

The direction of a reflected wave signal is shown in the radar coordinate system. In FIG. 8, a reflected wave signal is coming from the direction of θ, and the moving direction of the radar apparatus 1 is the direction of θs in the radar coordinate system. If a reflected wave signal is a reflected wave from a stationary object, Formula (1) below holds.

$$V = Vs \times \cos(\theta s - \theta) \quad (1)$$

Formula (1) can be transformed into Formula (2) below.

$$Vs = V/\cos(\theta s - \theta) \quad (2)$$

The signal processing unit 19 processes the reflected wave signal from the stationary object. The radar state estimation unit 20 calculates the radar speed Vs on the basis of the Doppler speed V from the stationary object and the azimuth θ of the stationary object by setting the traveling direction θs of the radar apparatus 1.

The radar state estimation unit 20 (potential radar speed calculation unit 201) sets multiple radar traveling directions θs using the Doppler speeds V and azimuths θ of multiple reflected wave signals in accordance with Formula (2) and calculates potential radar speeds Vsd corresponding to the set radar traveling directions θs.

Figure 9:
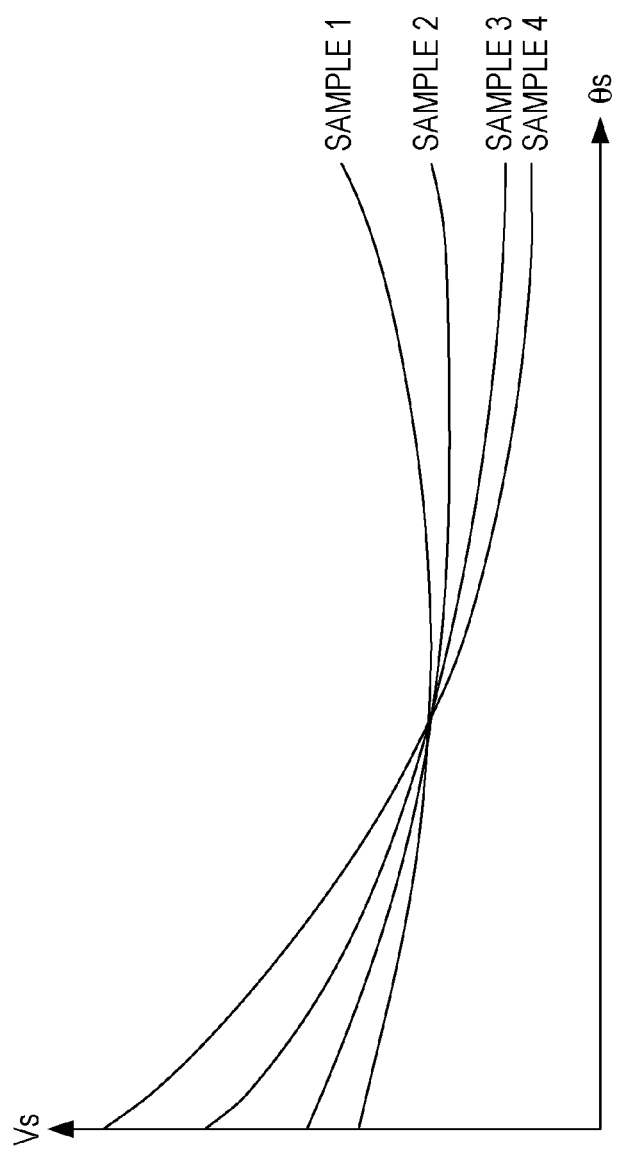
FIG. 9 shows an example of the voting process according to the first embodiment.

FIG. 9 is a diagram showing the relationship between the traveling direction (the traveling direction in the radar coordinate system) θs of each reflected signal and the radar speed Vs. Samples 1 to 4 correspond to the reflected signals. By setting multiple radar traveling directions θs for each sample, multiple radar speeds Vs can be calculated. Accordingly, a curve according to Formula (2) can be calculated for each sample.

<Voting Process>

Next, the voting process performed by the radar state estimation unit 20 will be described in detail.

Figure 10:
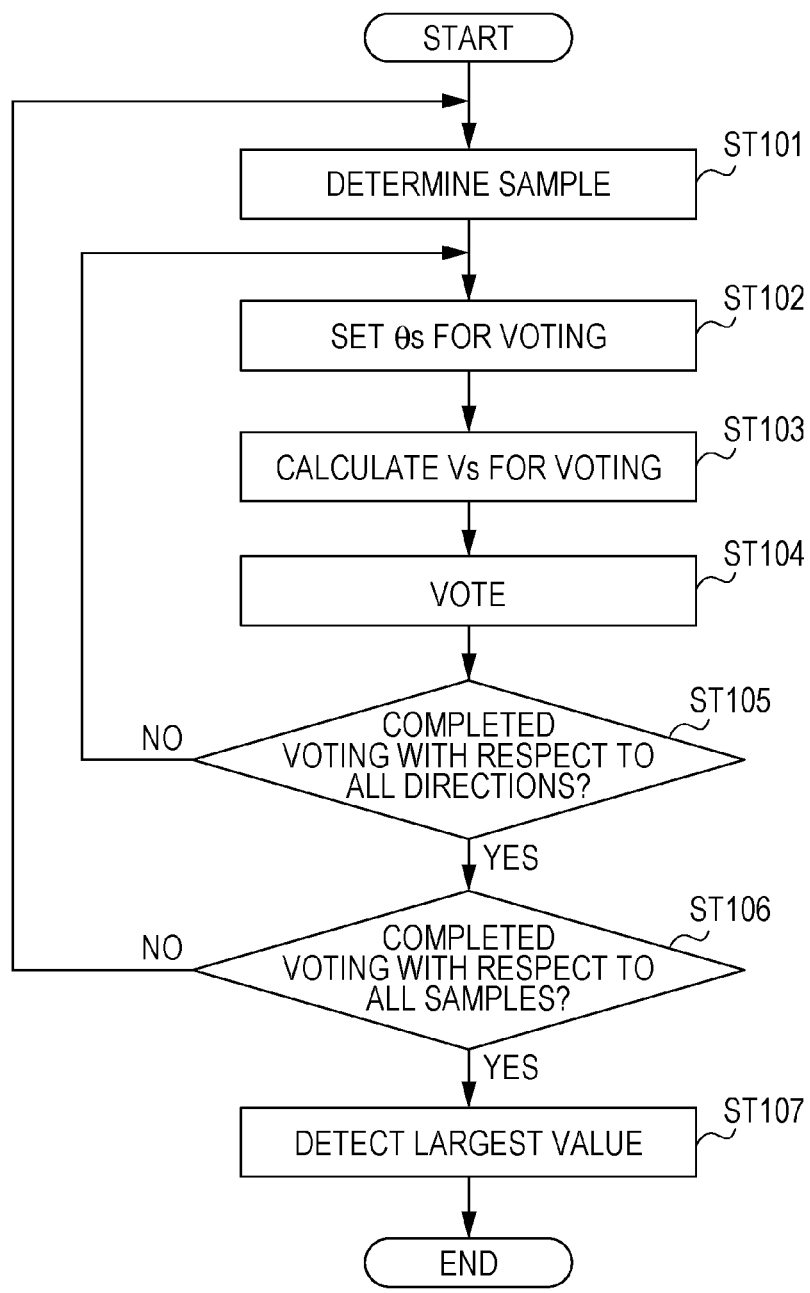
FIG. 10 shows the flow of a process performed by the radar state estimation unit according to the first embodiment.

FIG. 10 is a flow diagram showing the flow of the voting process performed by the radar state estimation unit 20.

The potential radar speed calculation unit 201 previously selects a predetermined number of samples from among the reflected signals (for example, see FIG. 2) processed in the signal processing unit 19. Each sample includes at least information indicating the Doppler speed V, direction θ, and reflection intensity.

In step (hereafter referred to as "ST") 101 of FIG. 10, the potential radar speed calculation unit 201 determines one of the predetermined number of samples as a sample to be subjected to a voting process. After the potential radar speed calculation unit 201 performs the voting process on the determined sample with respect to all directions (after ST105 becomes Yes], it sequentially determines another sample as a new sample to be subjected to a voting process until all the predetermined number of samples are selected (until ST106 becomes Yes).

In ST102, the potential radar speed calculation unit 201 sets a potential traveling direction θs for voting, which is to be subjected to a voting process, from among the multiple potential traveling directions θs of the vehicle. For example, the potential radar speed calculation unit 201 sequentially sets another potential traveling direction θs for voting as a new traveling direction to be subjected to a voting process until all the potential traveling directions Os are set (until ST105 becomes Yes).

In ST103, the potential radar speed calculation unit 201 calculates a potential radar speed Vs in accordance with Formula (2) using the Doppler speed V with respect to the sample, the azimuth θ, and the potential traveling direction θs for voting set in ST102. The potential radar speed calculation unit 201 regards the calculated potential radar speed Vs as a potential radar speed Vs for voting and outputs it along with the potential traveling direction θs for voting to the voting unit 202.

Figure 11:
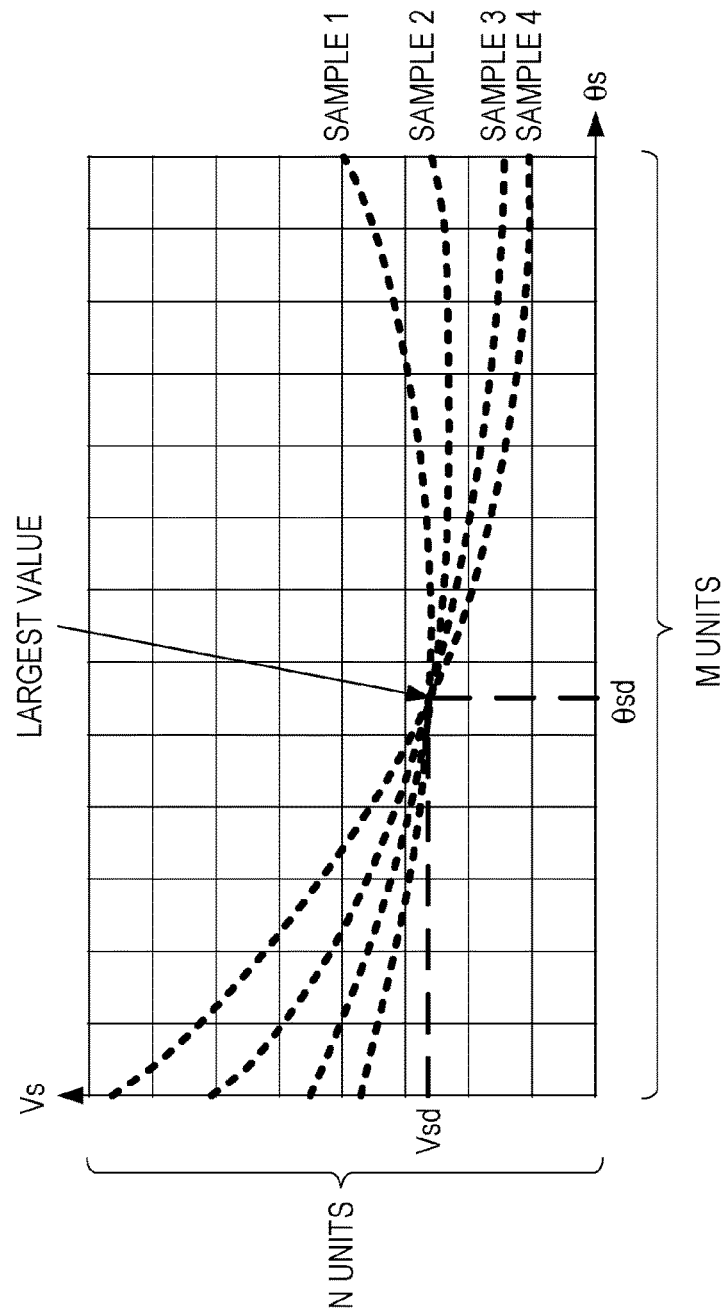
FIG. 11 shows the concept of the voting process according to the first embodiment.

In ST104, the voting unit 202 casts a potential state corresponding to the potential radar speed Vs for voting calculated in ST103 and the potential traveling direction θs for voting into the ballot box. FIG. 11 shows a voting process in which the reflection intensity is integrated with respect to the evaluation value of a potential state overlapping each sample.

Specifically, the voting unit 202 presets potential states for voting using the potential traveling directions θs for voting and potential radar speeds Vs for voting of the respective samples. For example, the potential traveling directions Os for voting are set in a range of 45° to +45° at intervals of 1°, and the number M of values which can be taken is 91. For the potential radar speeds Vs for voting, the range of values which can be taken is divided into N=100 units at predetermined intervals (e.g., 0.5 km/h). Thus, 9100 (M×N=91× 100) potential states are set. The voting unit 202 need not set a voting region as described above and may properly set a voting region in accordance with the required estimation accuracy.

Each time a vote is performed, the voting unit 202 adds (integrates) the reflection intensity of each sample to be subjected to a voting process to a potential state corresponding to the potential traveling direction θs for voting set in ST102 and the potential radar speed Vs for voting calculated in ST103 as the evaluation value of the potential state.

For each sample, the radar state estimation unit 20 performs ST102 to ST104 with respect to all directions that can be a potential traveling direction θs for voting. The radar state estimation unit 20 also performs ST102 to ST105 on the predetermined number of samples.

Of the predetermined number of samples, samples having higher reflection intensities have larger influences in voting. That is, in the voting process performed by the voting unit 202, the reflection intensities of the samples are used as weighing factors.

While reflection intensity is used as the weight of one vote in the present embodiment, the number of samples may be simply added with the weight set to 1. Another type of weights may also be used.

After the voting process is performed with respect to all directions for all the samples (ST105, ST106: Yes), the radar state estimation unit 20 proceeds to ST107.

In ST107, the determination unit 203 extracts a potential state having the largest evaluation value (the largest sum of reflection intensities) from the multiple potential states and determines a potential speed Vs and potential traveling direction θs corresponding to the extracted potential state as the current radar speed Vsd and radar traveling direction θsd.

That is, in the potential state having the largest value in FIG. 11, the relationships between the azimuths θ and Doppler speeds V of many reflected wave signals are established under the same conditions as those of the relationship between the radar moving direction θs and radar speed Vs. Thus, when many of multiple reflected signals are reflected wave signals from stationary objects, the radar apparatus 1 can calculate the radar moving direction θs and radar speed Vs.

FIG. 11 indicates that the samples are concentrated around the potential state corresponding to the actual traveling direction and speed (the potential state having the largest value: the traveling direction θsd and speed Vsd). On the other hand, in potential states distant from the potential state corresponding to the actual traveling direction and speed, the traveling directions θs and speeds Vs of the respective samples are distributed.

As the result of the voting (plotting) of the multiple samples (reflected wave signals) by the radar state estimation unit 20, the reflection intensities of more samples are assigned to potential states (traveling directions θsd and speeds Vsd) corresponding to values around the actual traveling direction and speed.

Accordingly, potential states closer to the actual traveling direction θs and speed Vs of the vehicle have larger sums of assigned reflection intensities. Thus, the radar state estimation unit 20 determines a potential state having the largest sum of assigned reflection intensities, of the multiple potential states, as the current traveling direction θsd and speed Vsd of the vehicle.

As described above, the calculated speeds Vs of the multiple samples are similar to each other around the actual traveling direction θs in FIG. 11. On the other hand, in traveling directions more distant from the actual traveling direction θs, the calculated speed Vs varies among the samples. For this reason, when the traveling direction θs and speed Vs of the vehicle are calculated from a single sample, it is difficult to estimate the vehicle state.

According to the present embodiment, the radar apparatus 1 estimates the traveling direction θs and speed Vs of the vehicle using multiple samples (reflected wave signals)

having different directions observed in the radar apparatus 1. At this time, the radar device 1 obtains reflected wave signal which are reflected from stationary objects, are coming from different directions, and serve as references for calculating the movement of the radar apparatus 1. Thus, compared to when calculating the traveling direction Os and speed Vs of the vehicle from a single sample, the moving state of the radar apparatus 1 can be estimated stably with improved estimation accuracy. Accordingly, the vehicle speed can also be stably estimated based on the moving state of the radar apparatus 1 with improved estimation accuracy.

Further, according to the present embodiment, the radar apparatus 1 uses reflected wave signals corresponding to a radar transmission signal. Thus, for example, it is possible to estimate the speed and traveling direction of the vehicle while reducing the influence of the slip of the tires and the influence of an error in the measurement by the speed sensor depending on the vehicle state and the traveling state of the vehicle.

Further, according to the present embodiment, the radar apparatus 1 is mounted on a side of the vehicle. Thus, the radar apparatus 1 can accurately estimate the speed and traveling direction of the vehicle, whether the vehicle is traveling straight or making a turn.

Second Embodiment

In the first embodiment, as described above, reflected wave signals are used as samples when estimating the moving state of the radar apparatus (radar speed and radar traveling direction), whether the reflected wave signals are reflected waves from stationary objects or reflected waves from moving objects. In the present embodiment, on the other hand, the speed and traveling direction of the vehicle are estimated using stationary objects among reflecting objects.

The distribution of Doppler speeds with respect to stationary objects around the vehicle (distribution curves shown in FIGS. 3A, 4A, and 5A) is determined according to the traveling direction of the vehicle (radar apparatus 2) and the relationships between the vehicle and stationary objects. On the other hand, the distribution of Doppler speeds with respect to moving objects depends on the traveling direction of the vehicle (radar apparatus 2) and the positional relationships between the vehicle and moving objects, as well as, for example, the traveling directions of the moving objects. Accordingly, when estimating the moving state of the radar using Doppler speeds with respect to moving objects, an error is more likely to occur than when making estimation using Doppler speeds with respect to stationary objects.

The radar apparatus 1 uses observed reflected wave signals whether the reflected wave signals are those from stationary objects or those from moving objects. However, to obtain the radar moving state and the vehicle speed, it is preferred to extract, from reflected wave signals including those from moving objects, those from stationary objects and to detect the radar moving state using the reflected wave signals from the stationary objects.

For this reason, in the present embodiment, when estimating the radar moving state (radar speed and region traveling direction), reflected wave signals from stationary objects of multiple reflected wave signals are used as samples.

[Configuration of Radar Apparatus 2]

Figure 12:
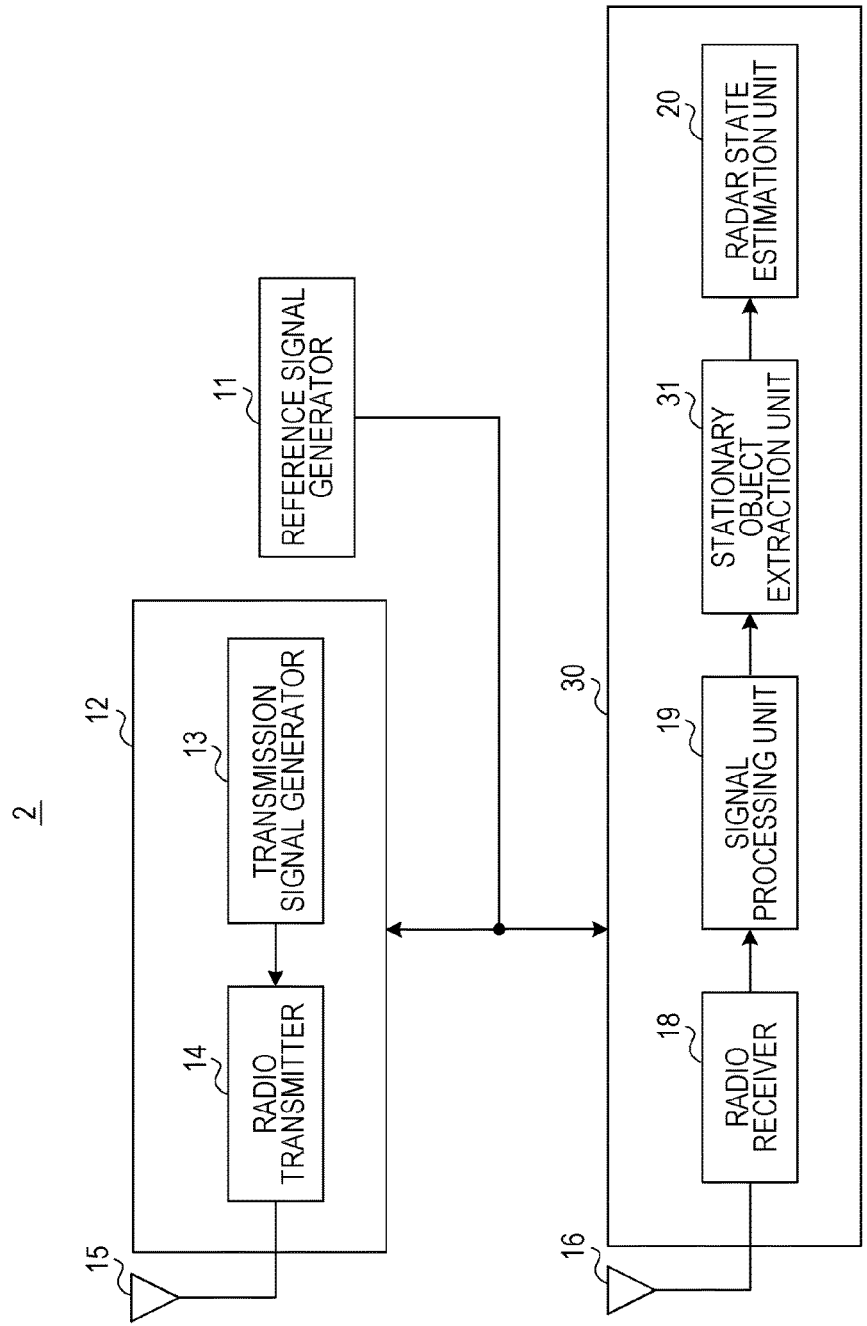
FIG. 12 shows the configuration of a radar apparatus according to a second embodiment.

FIG. 12 is a block diagram showing the configuration of the radar apparatus 2 according to the present embodiment. Elements that perform the same processes as those in the first embodiment are given the same reference signs in FIG. 12 and will not be described. The radar apparatus 2 according to the present embodiment differs from the radar device 1 according to the first embodiment in that a radar receiver 30 additionally includes a stationary object extraction unit 31.

In the radar receiver 30, the stationary object extraction unit 31 serving as an extraction unit receives, from a signal processing unit 19, distance-specific, azimuth-specific, and Doppler frequency component-specific power profiles (reflection intensities) of reflected wave signals reflected from objects, as in the first embodiment, and adds the reflection intensities to distance-specific data, and generates a power profile map in which power is plotted on the azimuth axis-Doppler axis shown in FIG. 2.

Figure 13:
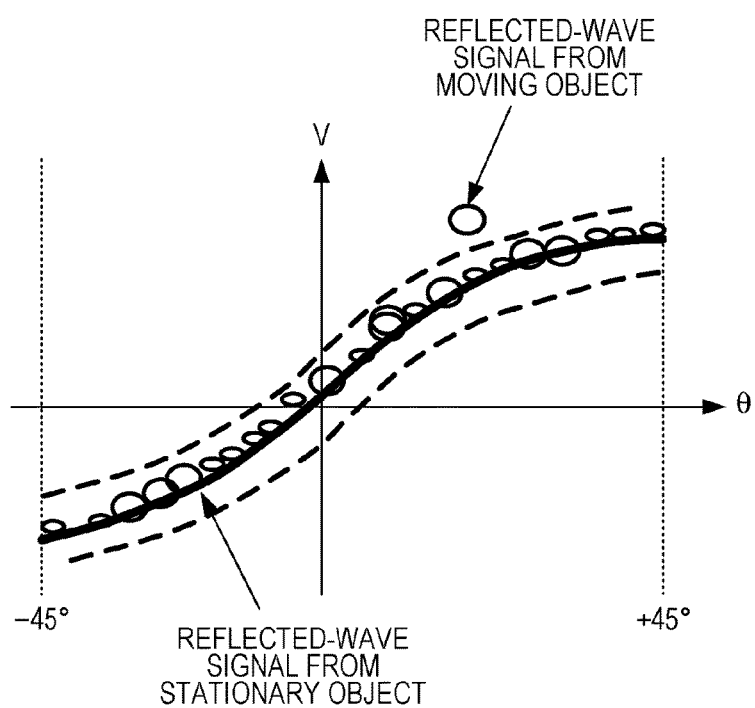
FIG. 13 shows a stationary object extraction process according to the second embodiment.

The stationary object extraction unit 31 stores the radar moving direction θs and radar moving speed Vs of the preceding frame. Since the radar moving direction θs and radar moving speed Vs do not significantly vary among the frames, the stationary object extraction unit 31 limits samples to be used for voting using these. Specifically, the radar moving direction θs and radar moving speed Vs of the immediately preceding frame are substituted into Formula (1); the radar viewing angle θ is changed; and the Doppler speed V is calculated. FIG. 13 shows the calculation process. The Doppler speed V corresponding to the changed radar viewing angle θ is shown by a thick solid line in FIG. 13. A predetermined margin is set for the Doppler speed shown by the thick solid line and thus the range of the Doppler speeds of samples to be used for voting is limited. A range surrounded by dotted lines in FIG. 13 is the limited range, and samples in the range are regarded as reflected wave signals from stationary objects. Thus, samples to be used for voting can be limited to reflected wave signals from stationary objects.

The stationary object extraction unit 31 extracts reflected wave signals from stationary objects from multiple reflected wave signals. Thus, the radar state estimation unit 20 determines the current speed Vs and traveling direction θs of the vehicle using the azimuths θ, the Doppler speeds V, and the reflection intensities of the multiple stationary objects of multiple reflected wave signals.

According to the present embodiment, the radar moving direction θs and radar moving speed Vs can be estimated more accurately than in the first embodiment and thus the vehicle speed can also be estimated more accurately.

The above method by which the stationary object extraction unit 31 extracts stationary objects is only illustrative. There may be used a method of predicting an approximate radar moving direction and an approximate radar speed using another sensor (e.g., a gyro sensor, accelerometer) so that reflected wave signals from stationary objects can be extracted.

Third Embodiment

Figure 14:
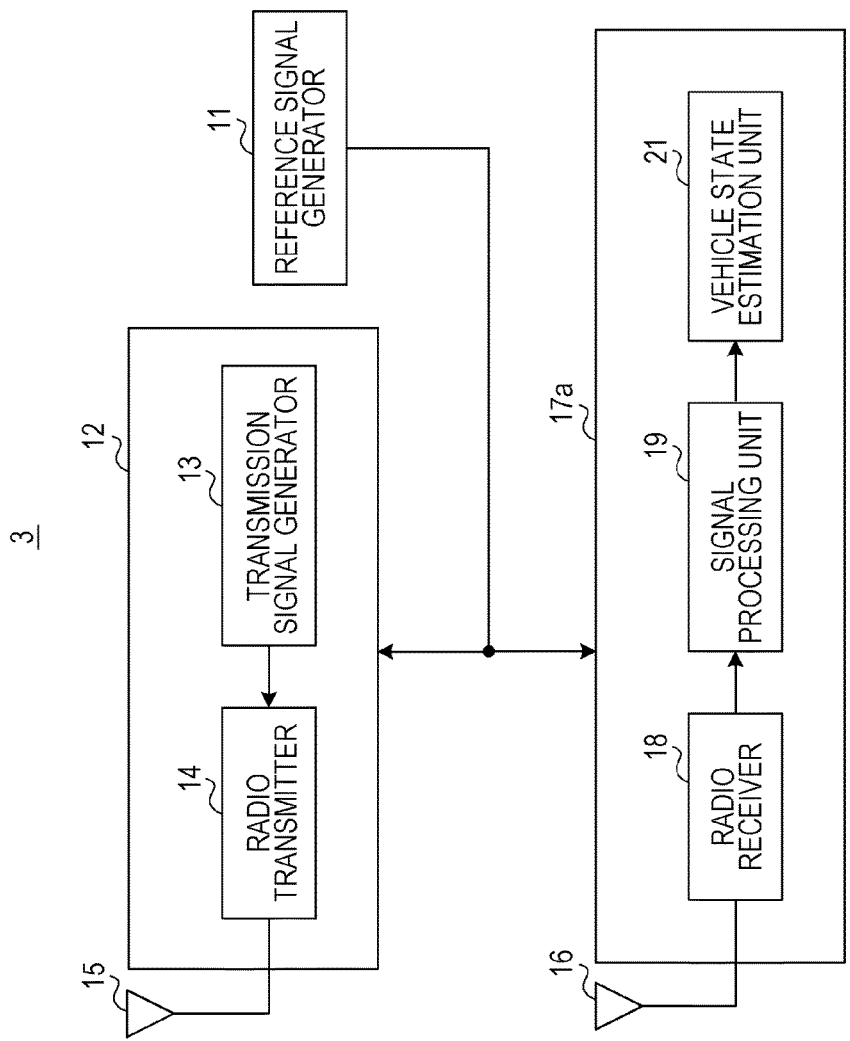
FIG. 14 shows the configuration of a radar apparatus according to a third embodiment.

FIG. 14 is a block diagram showing the configuration of a radar apparatus 3 according to the present embodiment. Elements that perform the same processes as those in the first embodiment (FIG. 1) are given the same reference signs in FIG. 14 and will not be described. The radar apparatus 3 according to the present embodiment differs from the radar device 1 according to the first embodiment in that the traveling direction and speed of a particular position in the vehicle are detected as the state of the vehicle having the radar apparatus 3 thereon using a result obtained by performing signal processing on reflected wave signals received by a receiving antenna 16 in a radar receiver 17a.

Figure 15:
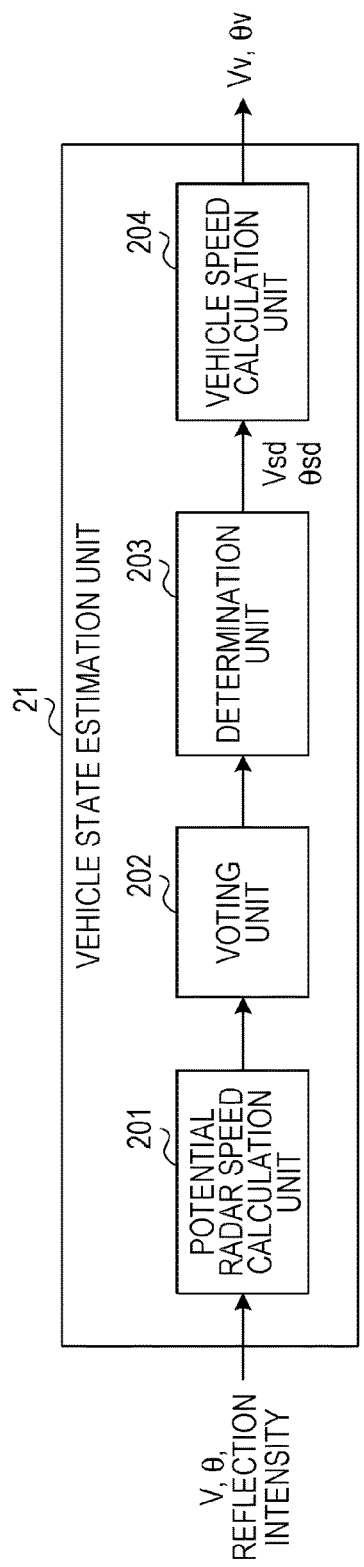
FIG. 15 shows the internal configuration of a vehicle state estimation unit according to the third embodiment.

FIG. 15 is a diagram showing the internal configuration of a vehicle state estimation unit 21 serving as a state estimation unit in the radar receiver 17a of FIG. 14. The vehicle state estimation unit 21 includes the potential radar speed calculation unit 201, voting unit 202, and determination unit 203 of the radar state estimation unit 20 of FIG. 6, as well as a vehicle speed calculation unit 204. The vehicle speed calculation unit 204 receives the radar speed Vsd and traveling direction θsd outputted from the determination unit 203 and calculates the speed (Vv) and traveling direction (θv) of any position in the vehicle.

Figure 16:
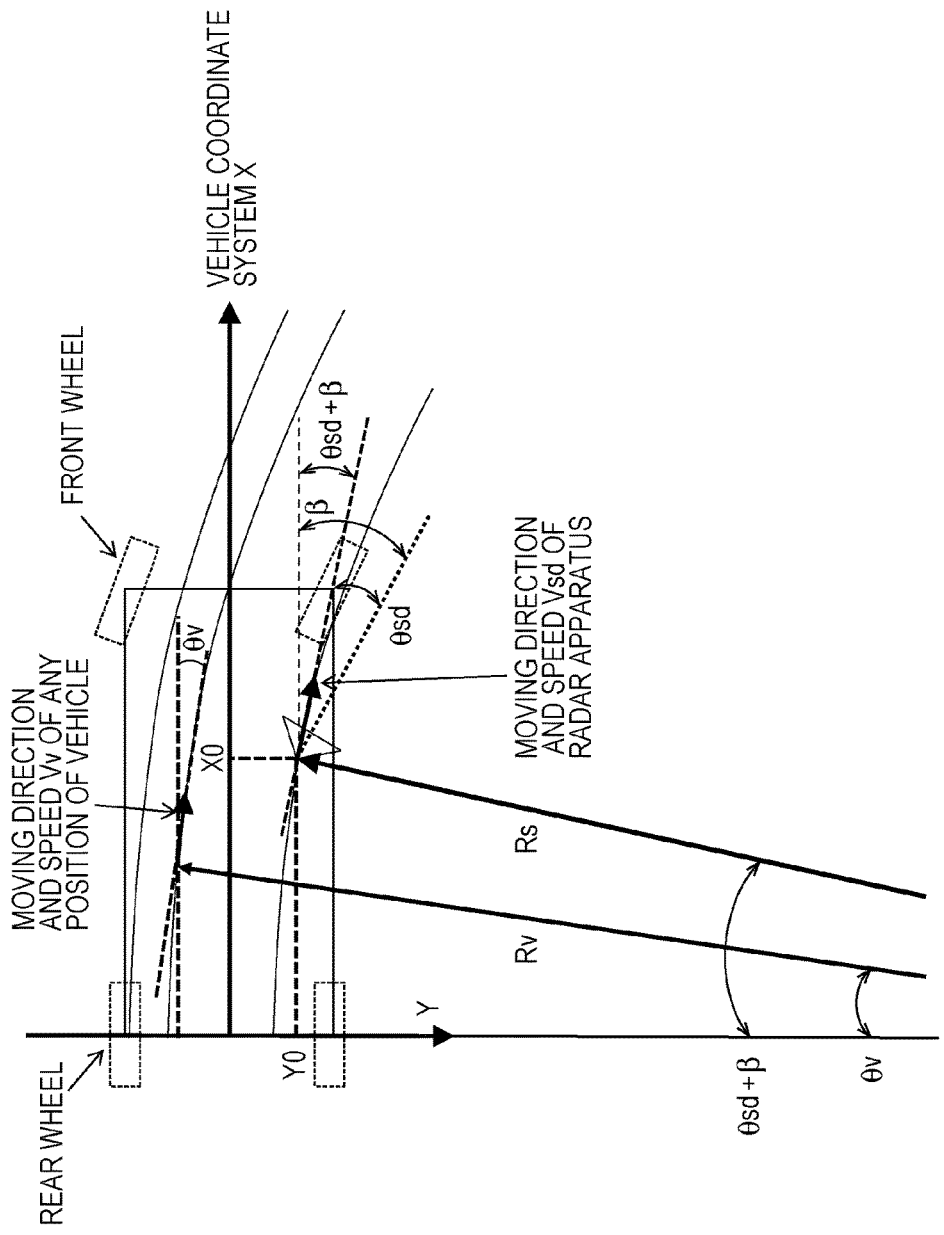
FIG. 16 shows the relationship between the radar apparatus according to the third embodiment and a vehicle.

FIG. 16 is a diagram showing the relationship between the positions and orientations of the radar apparatus 3 and vehicle. The forward direction of the radar apparatus 3 is the direction of an angle β in a vehicle coordinate system. The moving direction of the radar apparatus 3 is the direction of θsd+β in the vehicle coordinate system. When the vehicle is traveling straight, the moving direction of the radar apparatus 3 is the direction of θsd+β=0.

When the vehicle is traveling straight (θsd+β=0), the moving direction (θv) and speed (Vv) of any position in the vehicle are the same as the moving direction (θsd) and speed (Vsd) of the radar apparatus. Accordingly, the speed (Vv) of the vehicle is the speed Vsd of the radar apparatus 3, and the moving direction (θv) of the vehicle is 0.

A method for calculating the vehicle speed (θv) and moving direction (θv) of any position (Xv, Yv) in the vehicle in the vehicle coordinate system when the vehicle is making a turn (θsd+β≠0) will be described with reference to FIG. 16. Note that in FIG. 16, the vehicle is making a right turn.

First, the vehicle speed calculation unit 204 calculates the distance (turning radius Rs) between the radar apparatus 3 and the position (turning center; not shown) in which a direction (turning center direction) perpendicular to the traveling direction (θsd+β) of the vehicle in the mounting position (X0, Y0) of the radar apparatus 3 and an extension of a line connecting the left and right wheels cross each other.

$$Rs = X0/\sin(\theta sd+\beta) \quad (3)$$

where Rs represents the turning radius of the radar mounting position; X0 represents the x-axis radar mounting position in the vehicle coordinate system; θsd represents the radar moving direction of the radar mounting position in the radar coordinate system; and β represents the radar mounting orientation in the vehicle coordinate system.

The vehicle speed calculation unit 204 then calculates the vehicle turn angular speed (ω) from the distance (Rs) from the turning center of the vehicle to the mounting position of the radar apparatus 3 and the speed (Vsd) of the mounting position of the radar apparatus 3 in accordance with Formula (4) below.

$$\omega = Vsd/Rs \quad (4)$$

where ω represents the vehicle turn angular speed; Vsd represents the radar moving direction of the radar mounting position in the radar coordinate system; and Rs represents the turning radius of the radar mounting position.

The vehicle speed calculation unit 204 then calculates the turning radius (Rv) of any position (Xv, Yv) in the vehicle in accordance with Formula (5) below.

$$Rv = sqrt(Xv^2 + (Rs \times \cos(\theta sd+\beta) + Y0 - Yv)^2) \quad (5)$$

where Rv represents the turning radius of the position to be calculated; Xv represents the X-coordinate of the position to be calculated; Yv represents the Y-coordinate of the position to be calculated; Rs represents the turning radius of the radar mounting position; Y0 represents the Y-axis radar mounting position in the vehicle coordinate system; θsd represents the radar moving direction of the radar mounting position in the radar coordinate system; and β represents the radar mounting orientation in the vehicle coordinate system.

The vehicle speed calculation unit 204 then calculates the speed (Vv) and moving direction (θv) of any position (Xv, Yv) in the vehicle using the calculated turning radius (Rv) and vehicle turn angular speed (ω) in accordance with Formulas (6) and (7) below.

$$Vv = \omega \times Rv \quad (6)$$

where ω represents the vehicle turn angular speed; and Rv represents the turning radius of the position to be calculated.

$$\theta v = a\sin(Xv/Rv) \quad (7)$$

where Xv represents the X-axis of the position to be calculated; and Rv represents the turning radius of the position to be calculated.

In this way, the vehicle speed calculation unit 204 can calculate the moving direction and speed of any position in the vehicle.

The embodiments of the present disclosure have been described above.

Although not shown, the radar apparatus includes, for example, a central processing unit (CPU), a storage medium storing a control program, such as read only memory (ROM), and a working memory, such as random access memory (RAM). The functions of the elements described above are implemented when the CPU executes the control program. However, the hardware configuration of the radar apparatus is not limited to the above example. For example, the function units of the radar apparatus may be implemented in the form of an integrated circuit (IC). The function units may be implemented as individual chips, or some or all thereof may be implemented as one chip.

While the embodiments have been described with reference to the drawings, the present disclosure is not limited thereto, as a matter of course. Those skilled in the art would readily conceive of changes or modifications thereto without departing from the scope of Claims, and such changes or modifications are to be construed as falling within the technical scope of the present disclosure, as a matter of course. Further, any elements in the embodiments may be combined without departing from the scope of the present disclosure.

While the present disclosure has been described using the embodiments which are composed of hardware components, the present disclosure may be implemented in the form of software associated with hardware.

Typically, the function blocks used to describe the embodiments are implemented in the form of an LSI, which is an integrated circuit. The function blocks may be implemented as individual chips, or some or all thereof may be implemented as one chip. While the integrated circuit here is referred to as the LSI, it may be referred to as an IC, system LSI, super LSI, or ultra LSI depending on the degree of integration.

The method for forming an integrated circuit is not limited to LSI and may be to use a dedicated circuit or general-purpose processor. After manufacturing the LSI, a field programmable gate array (FPGA) may be used, or a reconfigurable processor, which can reconfigure the connection or setting of the circuit cells in the LSI, may be used.

If an integrated circuit technology which replaces LSI appears due to the progress of the semiconductor technology or due to a derived technology, the function blocks may be integrated using that technology, as a matter of course. Possible such technologies include bio technologies.

While the radar state estimation unit 20 sets a potential traveling direction θs for voting in ST102 and then calculates a potential radar speed Vs for voting, it may set a potential radar speed Vs for voting and then calculate a potential traveling direction θs for voting.

The present disclosure is suitable as a radar apparatus which detects the speed and traveling direction of the vehicle.

What is claimed is:

1. A radar apparatus, comprising:
   a transmitter that transmits a radar signal via a transmission antenna mountable on a side of a vehicle;
   a receiver that receives one or more reflected wave signals via a receiving antenna mountable on a side of the vehicle, the reflected wave signals being the radar signal reflected by one or more objects;
   a signal processing unit that determines azimuths of the objects, Doppler speeds between the radar apparatus and the objects, and intensities of the reflected wave signals by using the reflected wave signals; and
   a state estimation unit that estimates a speed and a traveling direction of the radar apparatus using the azimuths of the objects, the Doppler speeds, and the intensities of the reflected wave signals, wherein the state estimation unit includes:
      a calculation unit that sets a plurality of potential traveling directions of the radar apparatus and calculates a plurality of potential speeds of the radar apparatus corresponding to the potential traveling directions using the azimuths of the objects and the Doppler speeds;
      an assignment unit that assigns the intensities of the reflected wave signals from the objects to a plurality of potential states, the potential states being combinations of the potential traveling directions and the potential speeds of the radar apparatus; and
      a determination unit that determines, as the speed and traveling direction of the radar apparatus, a potential speed and a potential traveling direction corresponding to a potential state having the largest sum of the intensities or the reflected wave signals.

2. The radar apparatus according to claim 1, further comprising a vehicle speed calculation unit that calculates a traveling direction and a speed of a particular position in the vehicle using the determined speed and traveling direction of the radar apparatus and position information of the radar apparatus.

3. The radar apparatus according to claim 1, further comprising an extraction unit that extracts one or more stationary objects from the one or more objects using the reflected wave signals.

4. A method for estimating a radar state of a radar apparatus, comprising:
   transmitting, by the radar apparatus, a radar signal via a transmission antenna mountable on a side of a vehicle;
   receiving, by the radar apparatus, one or more reflected wave signals via a receiving antenna mountable on a side of the vehicle, the reflected wave signals being the radar signal reflected by one or more objects;
   determining, by the radar apparatus, azimuths of the objects, Doppler speeds between the radar apparatus and the objects, and intensities of the reflected wave signals by using the reflected wave signals; and
   estimating, by the radar apparatus, a speed and a traveling direction of the radar apparatus using the azimuths of the objects, the Doppler speeds, and the intensities of the reflected wave signals, wherein the estimating includes:
      calculating, by the radar apparatus, a plurality of potential speeds of the radar apparatus corresponding to a plurality of potential traveling directions using the azimuths of the objects and the Doppler speeds;
      assigning, by the radar apparatus, the intensities of the reflected wave signals from the objects to a plurality of potential states, the potential states being combinations of the potential traveling directions and the potential speeds of the radar apparatus; and
      determining, by the radar apparatus, as the speed and traveling direction of the radar apparatus, a potential speed and a potential traveling direction corresponding to a potential state having the largest sum of the intensities of the reflected wave signals.

5. The method according to claim 4, further comprising:
   calculating, by the radar apparatus, a traveling direction and a speed of a particular position in the vehicle using the determined speed and traveling direction of the radar apparatus and position information of the radar apparatus.

6. The method according to claim 4, further comprising:
   extracting, by the radar apparatus, one or more stationary objects from the one or more objects using the reflected wave signals.

* * * * *